US008890049B2

(12) United States Patent
Yuan et al.

(10) Patent No.: US 8,890,049 B2
(45) Date of Patent: Nov. 18, 2014

(54) RECEIVER FOR A QUANTUM COMMUNICATION SYSTEM

(75) Inventors: Zhiliang Yuan, Cambridge (GB); Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 346 days.

(21) Appl. No.: 13/227,970

(22) Filed: Sep. 8, 2011

(65) Prior Publication Data

US 2012/0063789 A1    Mar. 15, 2012

(30) Foreign Application Priority Data

Sep. 13, 2010 (GB) .................................. 1015241.1

(51) Int. Cl.
*H01J 40/14* (2006.01)
*G01J 1/44* (2006.01)
*H04L 9/00* (2006.01)
*H04L 9/08* (2006.01)
*H01L 31/02* (2006.01)

(52) U.S. Cl.
CPC . *G01J 1/44* (2013.01); *H04L 9/002* (2013.01); *H04L 9/0858* (2013.01); *H01L 31/02019* (2013.01); *H01L 31/02027* (2013.01)
USPC .................................................. 250/214 R

(58) Field of Classification Search
CPC .................. G01J 2001/442; G01J 2001/4466; H01L 31/02027; H01L 31/107
USPC ..................................................... 250/214 R
See application file for complete search history.

(56) References Cited

U.S. PATENT DOCUMENTS

| 6,396,614 | B1 * | 5/2002 | Yoshizawa .................... 398/202 |
| 7,031,621 | B2 * | 4/2006 | Nagakubo et al. ............ 398/208 |
| 7,211,780 | B2 * | 5/2007 | Nishiyama ................ 250/214 R |
| 7,297,922 | B2 * | 11/2007 | Giovannini et al. ... 250/214 AG |
| 2005/0001150 | A1 | 1/2005 | Yonemura |
| 2005/0047601 | A1 * | 3/2005 | Shields et al. ................ 380/283 |
| 2005/0100351 | A1 * | 5/2005 | Yuan et al. .................... 398/214 |
| 2006/0060756 | A1 | 3/2006 | Nishiyama |
| 2007/0223931 | A1 * | 9/2007 | Uchikata ....................... 398/147 |
| 2008/0135736 | A1 | 6/2008 | Koiwai et al. |
| 2009/0039237 | A1 * | 2/2009 | Inoue et al. ............... 250/214 R |
| 2009/0236502 | A1 | 9/2009 | Ishii |

FOREIGN PATENT DOCUMENTS

EP    0 852 435 A2    7/1998
(Continued)

OTHER PUBLICATIONS

United Kingdom Search Report Issued Jan. 7, 2011, in Great Britain Patent Application No. 1015241.1, filed Sep. 13, 2010.
Vadim Makarov, "Controlling passively quenched single photon detectors by bright light," New Journal of Physics 11, 065003, 2009, 10 pages.

(Continued)

*Primary Examiner* — Thanh Luu
(74) *Attorney, Agent, or Firm* — Oblon, Spivak, McClelland, Maier & Neustadt, L.L.P.

(57) ABSTRACT

A photon detection system including: an avalanche photodiode; a biasing circuit configured to reverse bias the avalanche photodiode; a first measuring circuit configured to measure avalanche events occurring in the avalanche photodiode as a transient current due to photon absorption; and a second measuring circuit configured to measure the bias current flowing through the avalanche photodiode.

13 Claims, 8 Drawing Sheets

(56) References Cited

FOREIGN PATENT DOCUMENTS

| | | |
|---|---|---|
| JP | 2003-243694 | 8/2003 |
| JP | 2006-287307 | 10/2006 |
| JP | 2007-259255 | 10/2007 |
| JP | 2010-520447 | 6/2010 |
| WO | WO 02/23690 A1 | 3/2002 |
| WO | WO 2006/046013 A1 | 5/2006 |
| WO | WO 2008104799 A1 * | 9/2008 |

OTHER PUBLICATIONS

Office Action issued Dec. 11, 2012 in Japanese Application No. 2011-192805 (With English Translation).

Lars Lydersen, et al., "Hacking commercial quantum cryptography systems by tailored bright illumination", Nature Photonics, vol. 4, Aug. 29, 2010, 5 pages.

O. Thomas, et al., "Efficient photon number detection with silicon avalanche photodiodes", Applied Physics Letters, vol. 97, Jul. 19, 2010, 4 pages.

* cited by examiner

RECEIVER FOR A QUANTUM COMMUNICATION SYSTEM

CROSS REFERENCE TO RELATED APPLICATIONS

Field

This application is based upon and claims the benefit of priority from UK Patent application no. GB1015241.1, filed Sep. 13, 2010; the entire contents of which are incorporated herein by reference.

BACKGROUND

Embodiments described herein generally relate to photon detectors.

Avalanche photodiodes (APDs) are generally used for single photon detection. APDs and particularly InGaAs APDs have been the cornerstone for single photon detection in practical quantum communication systems for over a decade thanks to their low cost compactness and cryogen-free operation. Their single photon sensitivity arises from avalanche multiplication with gigantic gain when biased over their breakdown voltage. Biasing below their breakdown voltage causes a loss of single photon sensitivity but even at these biases, the APD remains optically responsive and produces a photo current with a bias dependent gain.

Recently, a weakness has been reported in APD systems that they can be put into a "blinded state" where they are incapable of detecting single photons but where they may be manipulated using higher intensity pulses of radiation.

BRIEF DESCRIPTION OF THE DRAWINGS

Embodiments of the present invention will now be described with reference to the following non-limiting embodiments in which.

DETAILED DESCRIPTION

Figure 1:
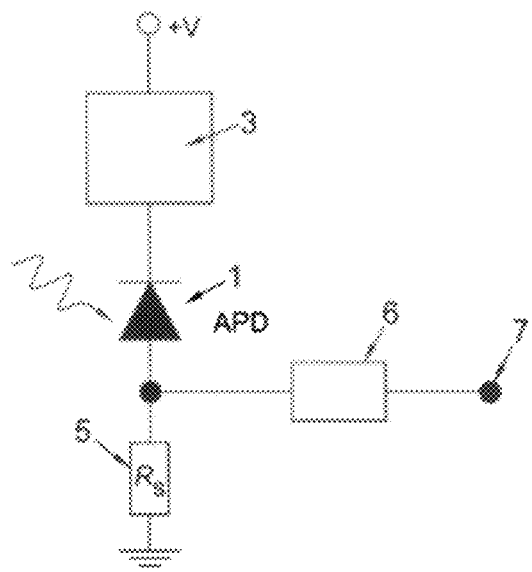
FIG. 1 shows a photon detection system in accordance with an example useful for understanding the present invention.

In one embodiment, the present invention provides a photon detection system comprising:
an avalanche photodiode
a biasing circuit configured to reverse bias said avalanche photodiode;
a first measuring circuit configured to measure avalanche events occurring in said avalanche photodiode as a pulsed current due to photon absorption; and
a second measuring circuit configured to measure the bias current flowing through the avalanche photodiode.

In this embodiment, the second measuring circuit measures the bias current across the APD. This is different to the avalanche event which is measured typically as a transient current by measuring the transient voltage drop over a resistor, referred to as the "sensing resistor" which is provided in the path between the APD and ground. The pulsed current has a duration from 100 ps to less than a microsecond. The amplitude of the transient avalanche current is required to be on the order of 1 mA, depending on the impedance of the sensing resistor, in order to overcome the discrimination level. In contrast, the DC bias current can be measured at a much higher precision. For example, 10 nA DC current can be measured without difficulty.

The bias current is measured with an integration time of 1 microsecond or longer. The bias current is therefore treated as the photocurrent that is averaged over time.

In an embodiment, the second measuring circuit is configured to indicate if the DC bias current exceeds the single photon regime. If the APD is subjected to high levels of radiation the APD can be "blinded", i.e., insensitive to further incoming single photons. This blindness is a result of a large photocurrent that causes the bias supplied to the APD to drop below its single-photon sensitivity level.

In one embodiment, the second measuring circuit is configured to indicate if the bias current exceeds 50% of the maximum photocurrent of the avalanche photodiode in the single photon counting regime. In a yet further embodiment, the second measuring circuit indicates if the photocurrent exceeds 10% of the maximum value.

In a further embodiment the second measuring circuit indicates that the bias current exceeds the single photon counting regime by issuing a predetermined erroneous signal. Such a predetermined signal may be a pulse sequence which will be recognised as indicating the presence of a blinding attack.

There are different types of bias circuits possible. A DC bias may be applied on its own, or a combination of a DC and AC may be applied. The second measuring circuit may be provided in series with the DC bias supply.

The alternating voltage supply may be configured to output an AC voltage in the form of a pulse, square wave or sinusoidal wave. The AC supply may be periodic or quasi periodic.

The blinding effect of high illumination is dependent on the resistance (quenching resistance) applied in series with the DC bias. The lower the quenching resistance, the weaker the blinding effect. In one embodiment, the quenching resistor has a resistance of 20 kΩ or less, more preferably 5 kΩ or less, even more preferably 1 kΩ or less. Photon detectors with higher quenching resistances are more prone to the blinding attack. Thus in one embodiment, the quenching resistance is at least 20 kΩ.

In the blinding attack, a higher continuous-wave (CW) optical power is incident on the detector.

In one embodiment, the first measuring circuit further comprises a unit for cancelling the capacitive response of the avalanche photodiode. For example, a self differencing circuit or a band bass filter may be provided.

In a further embodiment, a receiver for a quantum communication system is provided, the receiver being configured to receive light pulses encoded using a basis selected from at least two bases, the receiver comprising a decoder configured to perform a measurement in a basis selected from the possible bases used to encode the pulses and a photon detection system as described above, configured to receive the output of the decoder.

In a further embodiment, a quantum communication system is provided, comprising a sending unit configured to send light pulses encoded using a basis selected from at least two bases and the above described receiver.

FIG. 1 is a schematic of a photon detection system which is useful for understanding the present invention. The system comprises an avalanche photodiode (APD) 1. Avalanche photodiodes are well-known in the art and will not be described further here. The avalanche photodiode is reverse biased using biasing circuit 3 which is connected to the avalanche photodiode. The avalanche photodiode is connected to ground through a sensing resistor 5.

The transient voltage across this sensing resistor 5 is measured through circuit 6 which is connected between the avalanche photodiode 1 and the sensing resistor 5.

For single photon detection, the biasing circuit 3 is set so that the APD is biased above its breakdown voltage. In this state, a single photon incident on APD 1 has a finite probability to induce an avalanche multiplication of the single photon induced charge, producing a macroscopic current. This transient avalanche current is sensed as the voltage drop through sensing resistor 5. The transient voltage is then discriminated in the discriminator 6 against a predetermined voltage level, the discrimination level. When this discrimination level is overcome by the transient voltage, the discriminator outputs a well-defined electrical signal, for example, often as a TTL pulse, to feed the detector output, indicating a detection event.

Once a detection event registered, the avalanche current is quenched by bringing the APD bias below the APD breakdown voltage, after which the APD is reset to be single-photon sensitive state. The avalanche quenching can be achieved either passively using a large quenching resistor or actively using the avalanche current to control the APD bias. Alternatively, gated mode can also be used. In gated mode, an APD is biased above its breakdown voltage only for a short duration of time, typically a few nanoseconds, by a voltage gate. Outside the gate windows, the APD is biased below its breakdown voltage and therefore avalanches are quenched.

Figure 2:
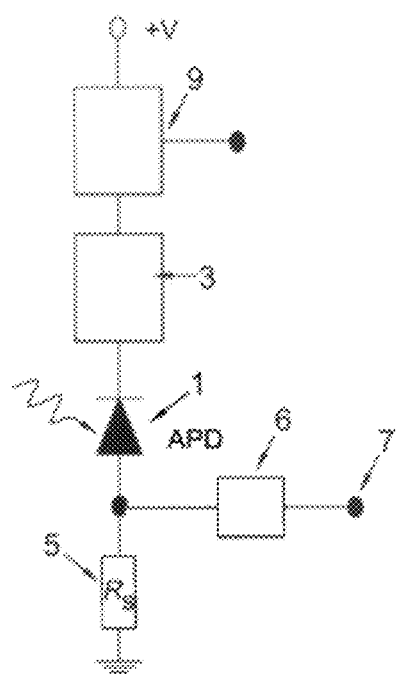
FIG. 2 shows a photon detection system in accordance with an embodiment of the present invention.

FIG. 2 is a schematic of a photon detection system in accordance with an embodiment of the present invention. To avoid unnecessary repetition, like reference numerals will be used to denote like features. The photon system of FIG. 2 is similar to the photon detection system of FIG. 1. However, a current monitor circuit 9 is provided which monitors the bias current flowing through APD 1, The relevance of this current monitor circuit 9 will be described in more detail later.

Figure 3A:
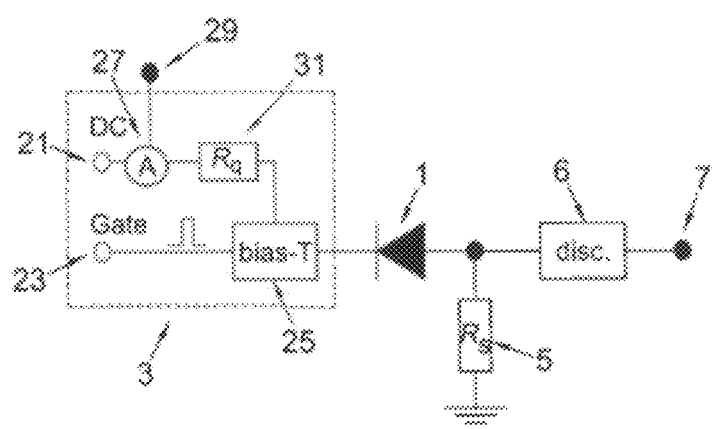
FIG. 3a shows a photon detection system in accordance with an embodiment of the present invention showing the current readout in detail and FIG. 3b shows a simplified quantum communication system.

FIG. 3*a* shows a photon detection system in accordance with an embodiment of the present invention where the biasing circuit and the current detection circuit 9 are shown in more detail. To avoid any unnecessary repetition, like reference numerals will be used to denote like features.

Here, the current monitoring circuit 9 is shown as part of biasing circuit 3. With a gated APD, the biasing circuit consists of a DC path 21 and an AC path 23. These join together by a bias T-junction 25. The DC path 21 comprises a DC voltage supply, a current monitor 27 with a readout output 29 and a quenching resistor 31. The DC voltage is set slightly below the breakdown of the APD 1 and a superimposed gate AC bias then biases the APD 1 above the breakdown in order to make the APD single photon sensitive for a predetermined amount of time. The modulating AC bias allows the APD to be quickly reset.

Figure 3B:
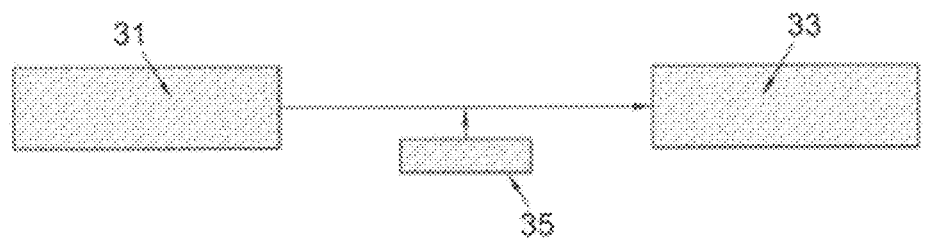

APDs are often used in quantum communication systems for single photon detection. In a simplified photon detection system of the type shown in FIG. 3*b*, Alice 31 will send photons to a receiver Bob 33.

In one well-known protocol system, the BB84 protocol, Alice will send single photons to Bob in one of two bases. For simplicity, it will be presumed that the photons are polarisation encoded although other types of encoding are possible such as phase etc. The polarisation bases will be selected from a first base which is horizontal and vertical polarisations and a second base which is rotated by 45° (although other bases are possible). If Alice sends a photon to Bob which is horizontally polarised and Bob uses a measurement bases which is the horizontal/vertical measurement bases then Bob can determine the polarisation of the horizontal photon with a theoretical accuracy of 100%. However, if Bob rotates his measurement bases by 45° from horizontal and vertical, he will only have a 50% chance of determining whether a horizontally polarised photon was sent. In the BB84 protocol, Alice 31 sends photons to Bob 33 randomly selecting between the two bases and Bob will also randomly change his measurement bases. Bob 33 then communicates with Alice over a classical channel to tell her which measurement bases he used for each photon, Alice then tells him which measurements he can keep (i.e. where they used the same bases) and they both establish the key.

Other protocols exist but most work on the principle that Alice and Bob will be measuring using one basis selected from one or more bases. If an eavesdropper Eve 35 is present and she intercepts a photon from Alice to Bob, the photon is destroyed. It is possible for Eve to reproduce the photon and then send it on to Bob. However, if she intercepts the communication as she will not know the correct bases within which to measure, she must make a guess of the correct measurement bases. This will mean that there is a probability that any photon she reproduces will not be resent to Bob in the same bases as originally sent by Alice. This manifests itself as an error in the key established between Alice and Bob and thus Eve's presence can be detected.

In practicality, Alice and Bob compare a small part of the key to determine Eve's presence from the errors in that part of the key. However, it has been recently proposed that if Bob uses an APD as his single photon detector, Eve can launch a so-called "blinding attack". In this attack, Eve will send a bright CW light which will blind Bob's detector.

When the detector is blinded by a continuous beam of light, the bias across the detector falls so that the detector is below its breakdown bias. In the blinding regime, an APD no longer produces a macroscopic avalanche pulse for a single incident photon. The optical power for blinding ranges from a few nanowatts to a few milliwatts, depending the detector circuit configuration and the type of the APD.

Although macroscopic avalanches do not occur in the blinding state, the APD continues to be optically responsive to the incident optical illumination, converting the optical illumination into a photocurrent output with a finite gain. When the detector is in this state, a strong pulsed radiation can stimulate a transient current pulse which simulates a single-photon avalanche signal. Therefore, Eve can send a pulse of radiation to force a detection click in the detector. The magnitude of Eve's pulse is set so that if Bob's detector fully receives the pulse, the pulse of radiation will register on Bob's detector. However, if the pulse is split, each of Bob's detectors will only receive half of the radiation and this will not be enough to trigger a detection event.

This attack is effective to the BB84 protocol. Whenever Bob chooses the same basis as Eve, the pulsed radiation is routed to a single detector. However, if Eve sends the pulse in one basis and Bob's detector is set to the other basis, then Eve's signal will be split, this means that each of Bob's detectors will only receive half of the radiation and this will not be enough to trigger a detection event. Therefore, Eve knows that if Bob uses a different measurement basis to her, then he will register that no photons arrived. The converse of this is that Eve knows that for every basis where Bob used Eve's sending basis, then Bob will have received a signal.

Therefore, when Bob communicates with Alice over the classical channel to advise when he received a signal and the basis he used, Eve can obtain exactly the same information about the key as Bob from this exchange since she was able to ensure that Bob did not register a detection event if they used a different basis.

Figure 4:
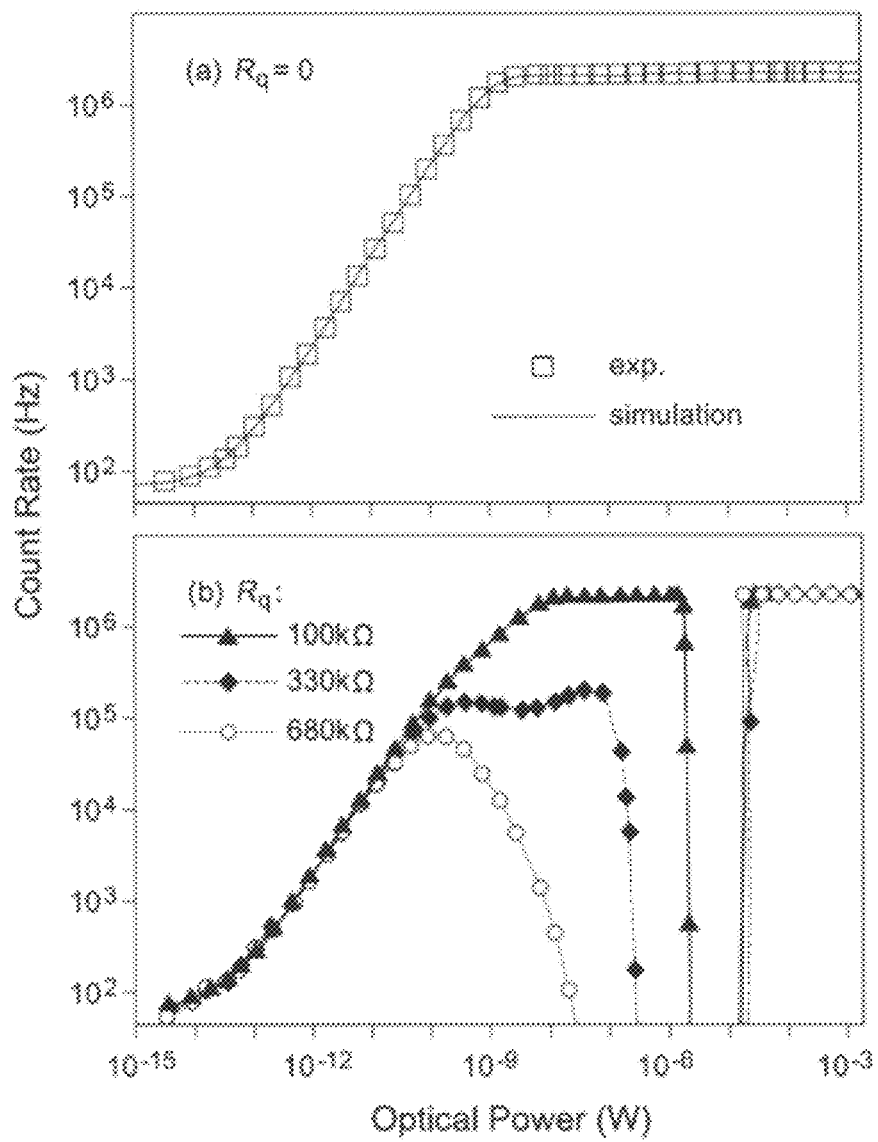
FIG. 4a is a plot of the photon count rate against optical power of an avalanche photodiode and FIG. 4b is a plot of the photon count rate against optical power for a photon detection circuit having in accordance with an embodiment of the present invention, three traces are shown for different values of the quenching resistance.

Therefore, the blinding attack is very powerful. Whether or not a detector can be blinded is partially dependent on the configuration of the measuring circuit. FIG. 3a shows the presence of a quench resistor 31. When the APD is blinded, the optical illumination produces too large a voltage drop across the quenching resistor so that the bias that applies to the APD decreases below its breakdown. This is shown in FIGS. 4a and b. FIGS. 4a and 4b show the count rate of photons measured with increasing optical power.

In obtaining the data shown in FIGS. 4a and 4b, an InGaAs APD is gated at a frequency of 2 MHz for single photon detection. The APD is illuminated by a 1550 nm laser diode.

FIG. 4a shows a situation where the quenching resistance is 0, i.e., no intentional quenching resistor is used. The experimental data show saturation, but no blinding effect. This experimental data agrees well with the simulation which assumes constant single photon detection efficiency.

FIG. 4b shows the data for quench resistances of 100 kΩ, 330 kΩ, and 680 kΩ. In all three cases, the count rate increases with optical power but then starts to sharply fall off. In all cases, the count rate drops to 0 for a period and this period of 0 count rate is when the photon detector is blinded (blinding region). As the optical power further increases, the trace returns to the saturated level seen in FIG. 4a.

It can be seen that the count rate falls more quickly and there is a larger blinding period for the higher resistance quench resistors.

Figure 5A:
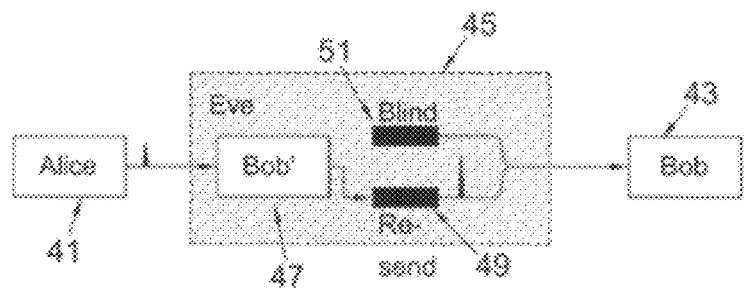
FIG. 5a is a schematic of a quantum communication system in accordance with an example useful for understanding the invention and showing how a blinding attack can be used in a QKD system.

FIG. 5a is a schematic of how Eve's blinding attack is constructed. Alice 41 sends single photon pulses as previously described to Bob 43. Eve 45 is located between Bob and Alice. Eve's equipment comprises a receiver 47 which will be the same as Bob's which is able to select between the same measurement bases as Alice. Eve then has a resending circuit 49 which allows her to resend a strong optical pulse to Bob 43 whenever a photon is registered in the measuring circuit 47. The pulse which is set by resend circuit 49 will be in the same basis as that measured by measuring circuit 47. Eve also has a blinding circuit 51 which sends a continuous wave of light to Bob of an intensity sufficient to move Bob's detector into the blinded region. The resend circuit 49 will send strong optical pulses which are of a large enough magnitude to produce a photo current pulse whose amplitude is sufficient to overcome the discrimination in the Bob's detector. As previously explained, the magnitude of the resent pulses is low enough so that if the signal is split (due to it being measured in an incorrect basis), the signal received by each of Bob's detectors will be too low to trigger a detection event.

By using the above attack, Eve knows exactly which of her measurements to keep and exactly which of her measurements to throw away which is measured using measuring circuit 47 and she can force Bob to only register measurements where she has used the same measuring basis as Bob. Therefore, by listening to Alice and Bob's classical communication over a classical channel, she can obtain 100% information on the key.

Figure 5B:
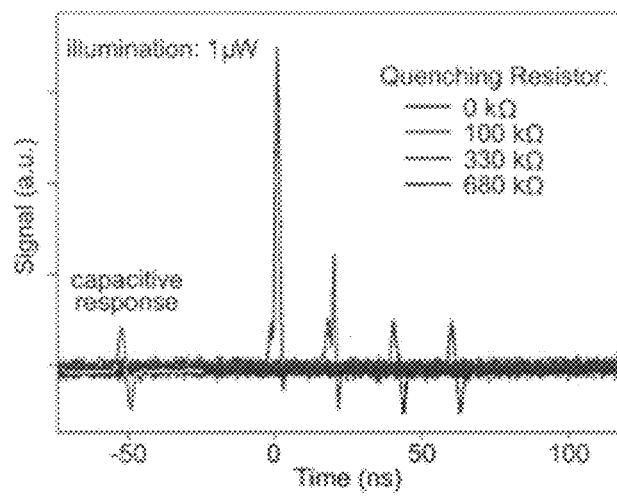
FIG. 5b shows the APD response in terms of output signal over time using four different values of quenching resistor.

FIG. 5b shows the APD output for different impedance quenching resistors. Illumination is at 1 micro watt, the tallest signal peak is seen for a quenching resistor of 0 kΩ, the next tallest for quenching resistance of 100 kΩ, the next one for 330 kΩ and the final one for 680 kΩ. When setting the discrimination level just above the capacitive response, the APD is blinded under 1 micro watt illumination for quenching impedance greater than 300 kΩ. It can be seen that the 300 kΩ and the 680 kΩ peaks are approximately the same height as that of the capacitive response peak.

Figure 5C:
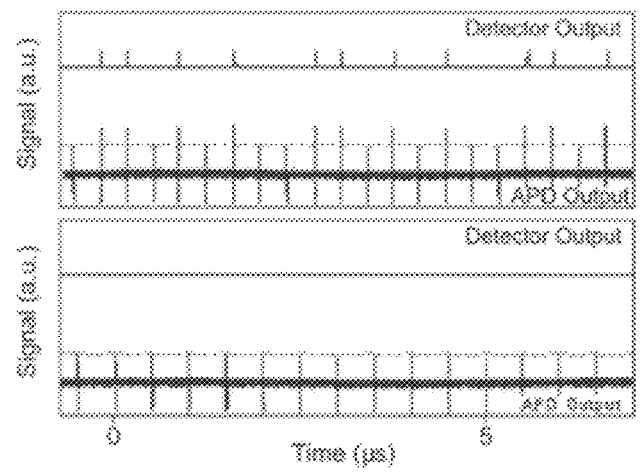
FIG. 5c shows photo response signal over time for the APD output, as well as the detector output signal after the discriminator, in response to signals sent by an eavesdropper.

FIG. 5c shows the results when Bob's detector is subjected to the blinding attack.

In the bottom panel, the detector is just subjected to the CW illumination. The APD shows output due to the gating signal. After the discrimination, the detector output which is upper trace is seen to be completely static. No detection events are registered.

In the upper panel, the resend circuit 49 is used to send pulses in addition to the CW signal from blinding circuit 51. When the signal sent is in the same measurement basis as Bob, the APD output is above the level of the discriminator (dotted line) and thus the detector output is seen to show peaks as shown in the upper trace of the top panel of FIG. 5c.

Figure 6A:
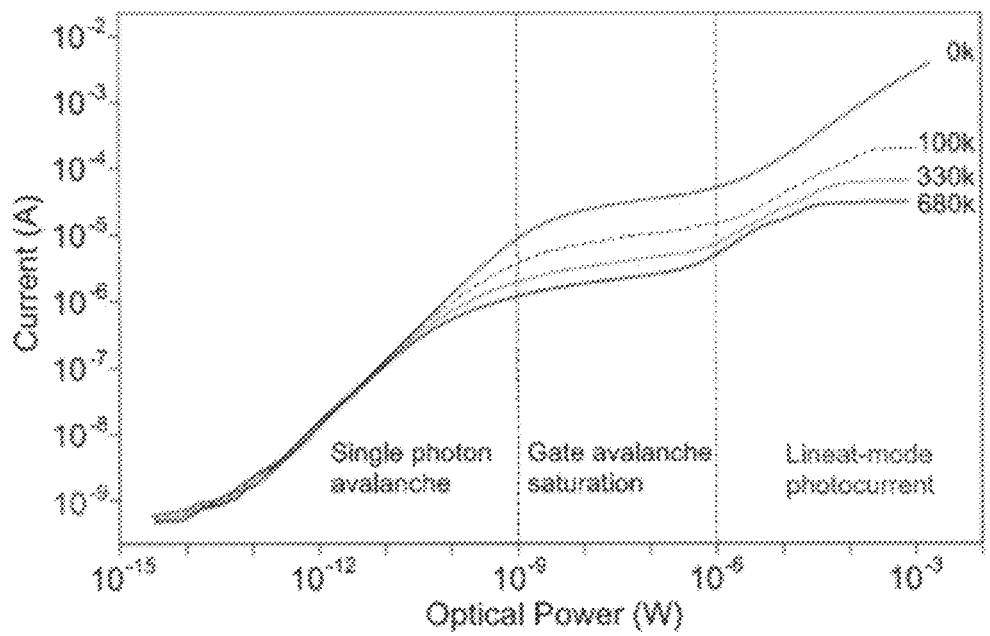
FIG. 6a shows a plot of photo current against optical power for four different quenching resistance values and FIG. 6b shows a plot of both count rate and photocurrent against optical power for a quenching resistance of 680 kΩ.

FIG. 6a shows a plot of the photo current verses the incident optical power. This data set is obtained with the photon count rate versus the incident optical power (FIG. 4a and b). In this measurement, a current monitor is placed in the DC path (FIG. 3) to measure the DC photocurrent. The plot can be sub-divided into three regimes, the single photon avalanche regime, gate avalanche saturation and finally the high optical power linear mode photo current.

In the single photon regime, $\mu\eta<1$ where $\mu$ is the average number of photons that falls into a detection gate while $\eta$ is the single photon detection efficiency. In this regime, the avalanche probability at each detection gate increases linearly with the incident optical power. These avalanches produce a current following through the DC bias path. The average of this current is measured to be linearly dependent on the incident optical power for all different quenching resistors. The single photon counting APD also acts as a conventional power meter in this regime.

After saturation of gated avalanches, the photo current becomes sub-linear with the incident optical power. In this regime, there is a macroscopic avalanche within each detection gate, and further increasing the incident optical power will not increase the avalanche probability.

Finally, at the high optical power, the optical power is so high that its photo current becomes comparable to that of the gated avalanches. As a result, the linear optical power dependence is observed again for the photocurrent.

Although the blinding attack can be largely mitigated by reducing the quenching resistance, it is also possible to prevent the blinding attack by monitoring the bias current through the APD in the DC path. FIGS. 2 and 3 show a current readout of the bias current which allows this current to be monitored.

Connecting FIG. 4b and FIG. 6, it is revealed that the photocurrent exceeds 500 nA when the detector moves from the single photon avalanche mode into the linear mode. Therefore, by monitoring the current through the APD, it is possible to tell if the detector has left the single photon avalanche mode. Whenever the photocurrent exceeds the single photon avalanche regime, the detector can be judged as being subjected to a blinding attack.

Figure 6B:
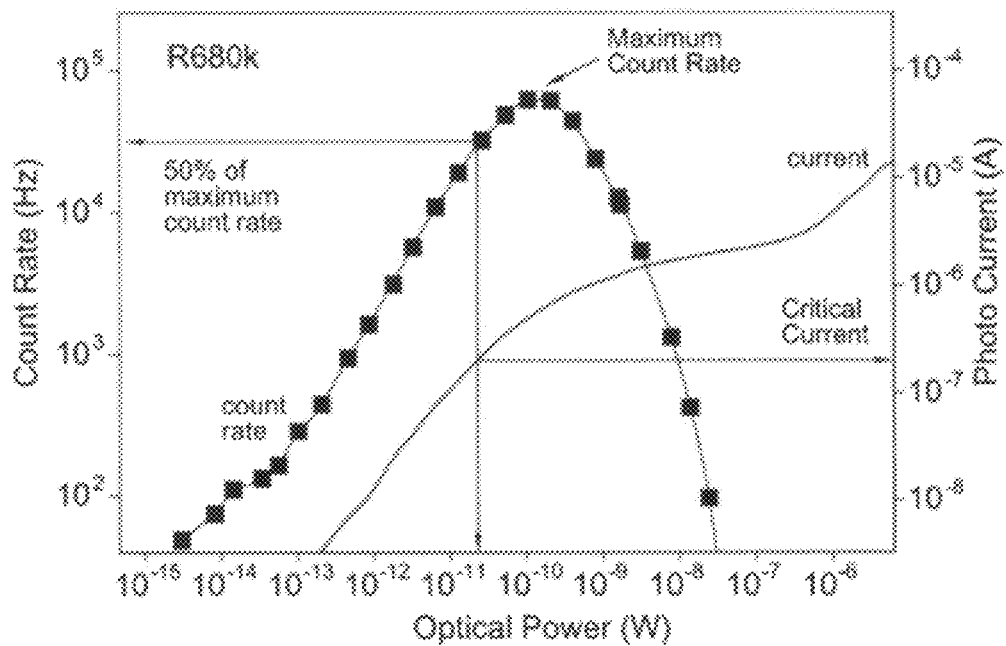

A critical current can be defined to detector a current anomaly. In FIG. 6b, the photocurrent and count rate are plotted together for the avalanche photodiode with a quenching resistor of 680 kΩ. First, the maximum count rate can be determined as 60 kilo-counts per second for the single photon counting regime. Defining the photocurrent at 50% of its maximum photon count rate as the critical current, here as 200 nA. Whenever the photocurrent is monitored above this value, the detector will be treated as being under a blinding attack.

The percentage of 50% of the maximum count rate, where the critical current can be defined, is just one example. A smaller value can be used, such as 10% or less. Use of a small value is well suited to quantum key distribution, with which a single photon detector rarely operates close to its maximum counting rate.

This percentage can also be set according to the expected photon arrival rate. In a quantum key distribution system, Alice's source intensity, the quantum channel transmission loss, and Bob's receiver loss are usually known values. Therefore, the photon detection rate can be estimated with a fair precision and hence the photo current. If the monitored photocurrent exceeds the expected value significantly, the detector will be regarded as under the blinding attack.

The critical current is detector dependent. For example, for the same avalanche photodiode, the critical current will be much greater when a lower resistance quenching resistor is used.

The ratio of the current to count rate can also be used to reveal the blinding attack. In the single photon counting regime, the photocurrent is linearly dependent on the count rate. With the photon current rate available, it is straightforward to work out the average photo-current per count. For example, in FIG. 6b, each photon count approximately corresponds to a current of 6 pA. A current anomaly may be defined whenever this ratio exceeds 10 times than it should be in the single photon counting regime.

Figure 7:
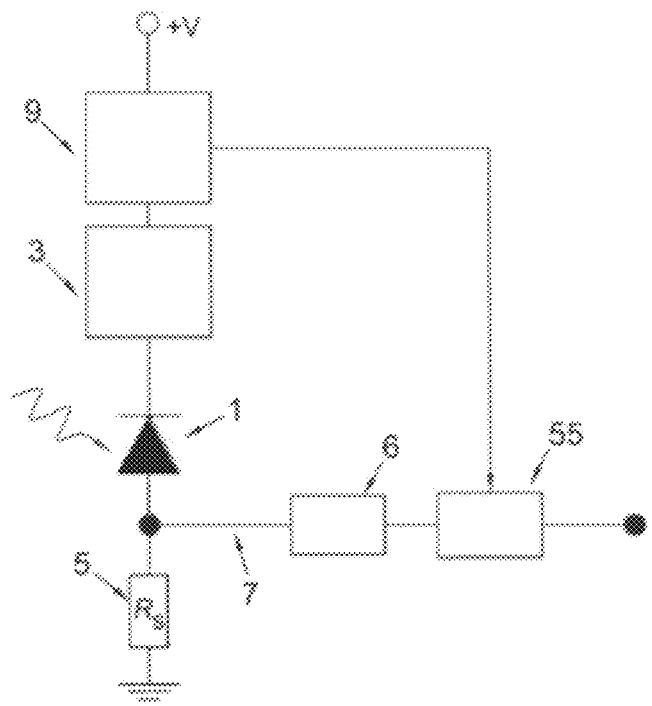
FIG. 7 is a schematic of a photon detection system in accordance with a further embodiment of the present invention.

FIG. 7 is similar to the arrangement of FIG. 2 and to avoid any unnecessary repetition, like reference numerals will be used to denote like features. Here, the current monitor which monitors the photo current to determine if the detector is subject to an attack is fed back to a conditioning circuit 55. Conditioning circuit 55 conditions the output from discriminator 6. The conditioning circuit 55 receives an input from the current monitor 9. When the monitored current is less than a predetermined critical value (for example, the photocurrent corresponding to 50% of its maximum count rate) the conditioning circuit can be set to be a direct feedthrough, i.e., the conditioning circuit 55 does nothing to the discriminator output. However, if the current exceeds this critical value, the detector is treated under the blinding attack. In this case, the conditioning circuit 55 can disable the detector output. Alternately, the conditioning circuit can be set to output a predetermined pulse stream which is not related to the measured photons. Such a predetermined pulse stream would produce many errors when the detector is used for quantum communication thus revealing the presence of an eavesdropper.

Figure 8:
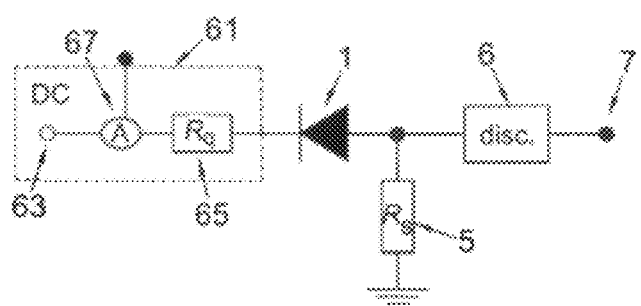
FIG. 8 is a plot of a photon detection system in accordance with a yet further embodiment of the present invention.

FIG. 8 is a schematic of a photon detection system in accordance with an embodiment of the present invention with a passively quenched circuit.

To avoid any unnecessary repetition, like reference numerals will be used to denote like features. The biasing circuit here 61 comprises a single DC input 63, a quenching resistor 65 and a readout circuit 67 which is provided in series between the DC input and the quenching resistor. In this passively quenching circuit, an avalanche is quenched passively by the quenching resistor 65. When an avalanche occurs, the avalanche current flowing through the quenching resistor 65 causes a bias reduction across the APD and thus the avalanche is self-quenched. The order of the readout circuit (67) and quenching resistor may be changed.

This operates the same as the previous embodiments where the current readout circuit 67 is used to monitor if the photo current becomes too high.

Figure 9:
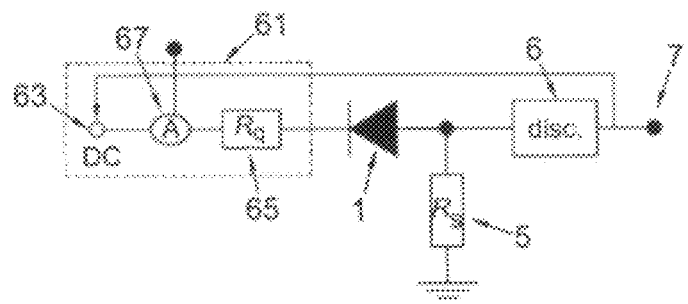
FIG. 9 is a schematic of a photon detection system in accordance with a further embodiment of the present invention that uses active quenching.

FIG. 9 shows an active quenching circuit. To avoid any unnecessary repetition, like reference numerals will be used to denote like features. This arrangement is similar to the passive quenching circuit. However, here, when an avalanche is discriminated by a discriminator 6, there is a feedback loop provided which brings the DC bias 63 back below the APD breakdown voltage in order to reset the APD 1.

In this situation, the current monitor is again inserted in the DC bias path.

Figure 10:
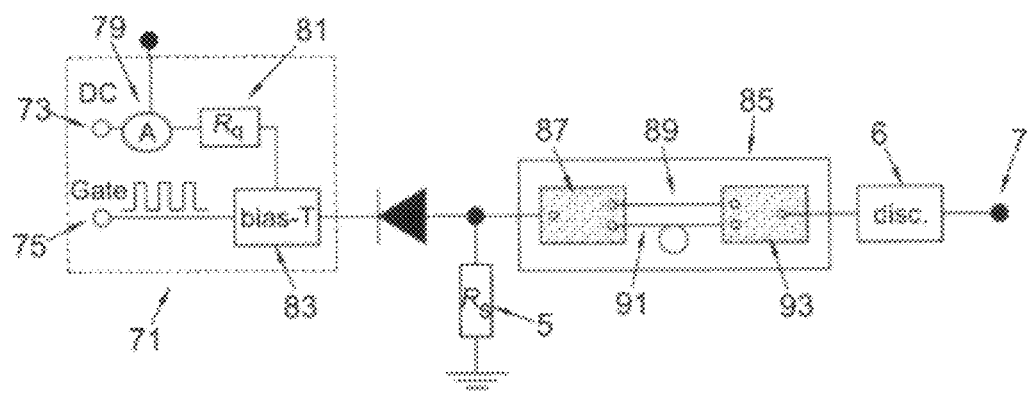
FIG. 10 is a schematic of a photon detection system in accordance with a further embodiment of the present invention which uses a self differencing circuit.

FIG. 10 shows a photon detection system in accordance with a further embodiment of the present invention. To avoid any unnecessary repetition, like reference numerals will be used to denote like features.

In this embodiment, the biasing circuit 71 again comprises a DC input 73 and an AC input 75. The AC input provides a gating signal for the APD 1. A current readout circuit 79 is provided in series with the DC input and a quenching resistor 81. The DC input and AC inputs are then combined at bias T 83.

The DC signal is set at a level to be just below that of the breakdown bias of the APD. If the gating bias provided by input 75 then switches the APD above the breakdown bias and below the breakdown bias. When the APD is biased above the breakdown bias, then it is capable of single photon detection. The APD itself is configured in the same way as described before. The voltage drop over sensing resistor 5 is then first passed through self differencing circuit 85. The self differencing circuit is described in more detail in earlier patent publication number WO2008/104799 which is herein incorporated by reference. The self differencing circuit first divides the signal in signal divider 87. The signal is divided into two equal parts. One part is sent along output channel 89 and the other part is sent along output channel 91. Output channel 91 has a delay loop which delays the signal passing along this channel by an integer number of periods with respect to the signal passing along output channel 89. One of the signals along output channel 89 and output channel 91 is then inverted and the signals are combined at signal combiner 93. The inversion may take place at either signal combiner 93 or at signal divider 87. A single photon will not be detected in every single gating period. Therefore, by time shifting the inverted signal by one period and combining the signals, an output is seen which just relates to the avalanche peak. This output is then passed through discriminator 6 and into detector output 7.

Figure 11:
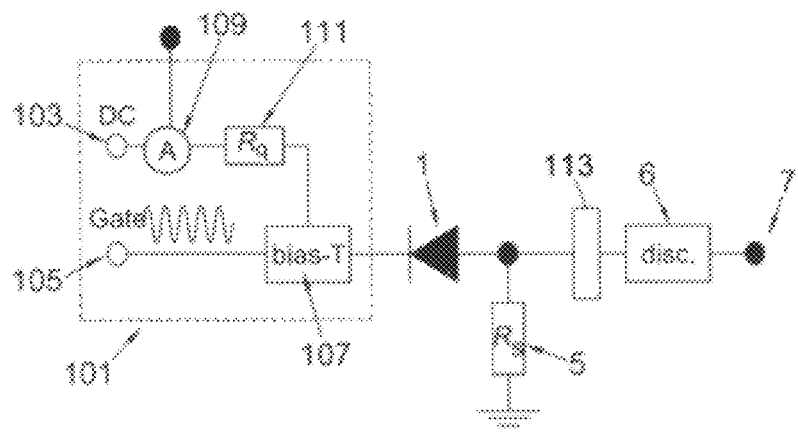
FIG. 11 is a schematic of a photon detection system in accordance with an embodiment of the present invention which uses sign-wave gating.

FIG. 11 shows a photon system in accordance with a yet further embodiment of the present invention. Here, like reference numerals will be used to denote like features. The biasing circuit 101 again has a DC input 103 and an AC input 105. In this case, the AC input comprises a sine wave which is fed to bias T 107. The DC input again comprises a current monitoring circuit 109 and the DC signal is passed into quenching resistor 111. The DC signal is combined with an AC signal at bias T 107 and the signal is passed into APD 1. In the same way as described with reference to FIG. 10, the DC input biases the APD at just below the breakdown voltage. The gating signal raises the APD above and below the breakdown voltage as required. The voltage drop across sensing resistor 5 is measured as before and the signal is passed into band rejection filter 113. Band rejection filter 113 is then used to subtract off the frequency of the gating signal which should just allow the avalanche signal to remain. The signal is passed through discriminator 6 and out of detector output 7.

Figure 12:
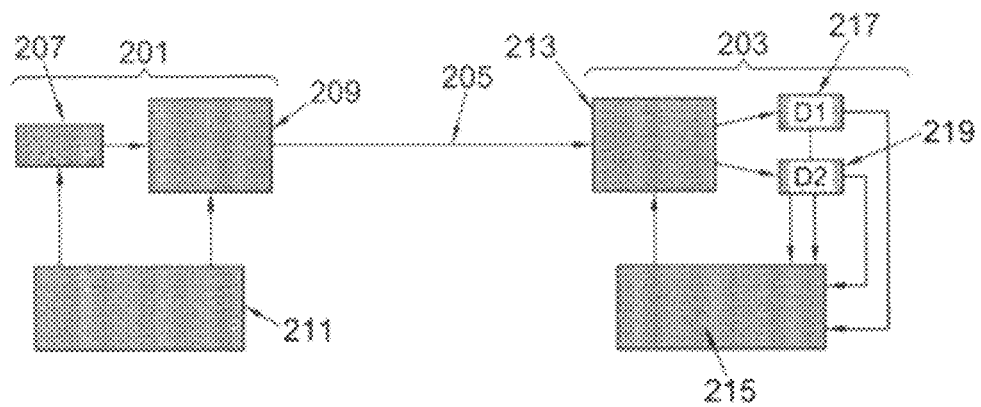
FIG. 12 is a schematic of a QKD system comprising photon detection systems in accordance with embodiments of the present invention.

FIG. 12 is a schematic of a quantum communication system in accordance with an embodiment of the present invention. The quantum communication system comprises a sender 201 which is referred to as Alice and a receiver, Bob 203. Alice 201 sends encoded pulses to Bob 203 along optical fibre 205. It should be noted, that although this is a simple system with one sender and one receiver, the same principles can be applied to quantum entangled systems and systems with multiple receivers or routers.

The sender in its simplest form comprises a source 207 which outputs photon pulses to an encoder 209. The encoder can encode the pulses in one of two or more bases. The basis used for sending the pulses is controlled by controller 211. The decoder 213 decodes the pulses by selecting a measurement basis under control 215. Once a measurement basis has been selected, the decoder will either direct the weak pulse to detector D1 217 or detector D2 219. If the measurement basis has been correctly selected by the decoder to match that of Alice's sending basis, then the result can be determined with a theoretical accuracy of 100%. If an incorrect basis has been used, then either detector could register a count with a 50% accuracy.

As a defence against the blinding attack, either detector D1 or D2 is a detector of the type described with reference to any of FIGS. 2 to 11. This detector then has a current monitoring circuit. In one embodiment, the current monitoring circuit can determine if the photo current is above a predetermined threshold and indicate to the control to ignore anything detected when the photo current is this high. In an alternative embodiment, when such a high photo current is determined, a predetermined pulse sequence can be sent to the controller. This will result in a large quantum bit error rate which will indicate the presence of the attack.

In a further embodiment, if the photo current increases, the receiver 203 may be further provided with an optical power monitor to monitor the optical power impinging on the detector.

While certain embodiments have been described, these embodiments have been presented by way of example only, and are not intended to limit the scope of the inventions. Indeed novel methods and systems described wherein may be embodied in a variety of other forms; furthermore various omissions, substitutions and changes in the forms of the methods and systems described herein may be made without departing from the spirit of the inventions. The accompanying claims and their equivalents are intended to cover such forms or modifications as would fall within the scope and spirit of the inventions.

The invention claimed is:

1. A receiver for a quantum communication system, the receiver being configured to receive light pulses encoded using a basis selected from at least two bases, the receiver comprising:
   a decoder configured to perform a measurement in a basis selected from possible bases used to encode the pulses and a photon detection system configured to receive an output of the decoder, wherein the photon detection system comprises:
   an avalanche photodiode;
   a biasing circuit configured to reverse bias said avalanche photodiode, the biasing circuit comprising a DC path and an AC path, the DC path comprising a DC voltage source configured to supply a DC voltage and the AC path comprising an AC voltage source configured to provide a modulating AC bias voltage which is superimposed on the DC voltage such that said avalanche photodiode is periodically biased above its breakdown voltage for photon detection;
   a first measuring circuit configured to measure avalanche events occurring in said avalanche photodiode as a transient current due to photon absorption; and
   a second measuring circuit configured to measure the bias current flowing through the DC path, the second measuring circuit being configured to indicate to a controller that the receiver is experiencing a blinding attack when said measured bias current exceeds a threshold value, wherein the threshold value is less than a maximum photocurrent for the avalanche photodiode in a single photon regime.

2. A receiver according to claim 1, wherein the second measuring circuit is configured to measure the bias current with an integration time of 1 microsecond or longer.

3. A receiver according to claim 1, wherein the second measuring circuit is provided in series with the DC voltage source.

4. A receiver according to claim 3, wherein the bias circuit comprises a quenching resistor provided in series with said DC voltage source, said quenching resistor having a resistance of 20 k$\Omega$ or more.

5. A receiver according to claim 1, wherein the second measuring circuit further indicates that the receiver is experiencing the blinding attack by issuing a predetermined erroneous signal to indicate that what is detected by the APD should be ignored.

6. A receiver according to claim 5, wherein the predetermined erroneous signal is a fixed electrical pulse stream.

7. A receiver according to claim 1, wherein the second measuring circuit further indicates that the receiver is experiencing the blinding attack by disabling a detector output.

8. A receiver according to claim 1, wherein the second measuring circuit is configured to indicate if the bias current exceeds the value corresponding to 10% of the of the maximum photocurrent of the avalanche photodiode in the single photon regime.

9. A receiver according to claim 1, wherein said modulating AC bias voltage is in the form of a pulse, square wave or sinusoidal wave.

10. A receiver according to claim 1, wherein the modulating AC bias voltage is periodic.

11. A receiver according to claim 1, wherein the first measuring circuit further comprises a unit for compensating for the capacitive response of the avalanche photodiode.

12. A quantum communication system, comprising a sending unit configured to send light pulses encoded using a basis selected from at least two bases and a receiver according to claim 1.

13. A method of detecting a photon in a receiver for a quantum communication system, the receiver being configured to receive light pulses encoded using a basis selected from at least two bases, the receiver including a decoder configured to perform a measurement in a basis selected from possible bases used to encode the pulses and a photon detection system configured to receive an output of the decoder, wherein the photon detection system includes an avalanche photodiode, the method comprising:

- periodically reverse biasing said avalanche photodiode above its breakdown voltage for photon detection by supplying a DC voltage from a DC voltage source and a modulating AC bias voltage superimposed on the DC voltage from an AC voltage source;
- measuring avalanche events occurring in said avalanche photodiode as a transient current due to photon absorption;
- measuring the bias current flowing through a DC path comprising the DC voltage source; and
- indicating to a controller that the receiver is experiencing a blinding attack when said measured bias current exceeds a threshold value, wherein the threshold value is less than a maximum photocurrent for the avalanche photodiode in a single photon regime.

* * * * *